United States Patent [19]

Forster

[11] Patent Number: 4,979,582
[45] Date of Patent: Dec. 25, 1990

[54] SELF-PROPELLED ROLLER DRIVE UNIT

[76] Inventor: Lloyd M. Forster, 1827 Golf Ridge, Bloomfield Hills, Mich. 48013

[21] Appl. No.: 525,973

[22] Filed: Aug. 24, 1983

[51] Int. Cl.⁵ .................... B60B 19/12; B62D 63/00
[52] U.S. Cl. ..................... 180/20; 180/65.1; 180/65.6; 446/458
[58] Field of Search .......... 180/20, 74, 10, 295, 180/65.1, 65.4, 13, 54.2, 55, 60, 65.2, 65.5, 65.6, 65.7, 65.8, 68.5, 297, 312, 62; 74/206, 798; 272/115; 446/431, 462, 458

[56] References Cited

U.S. PATENT DOCUMENTS

| | | | |
|---|---|---|---|
| 653,169 | 7/1900 | Coleman | 180/65.1 X |
| 1,139,882 | 5/1915 | Markle | 180/65.4 X |
| 2,535,396 | 12/1950 | Dube | 446/458 X |
| 2,949,696 | 8/1960 | Easterling | 446/462 |
| 2,977,714 | 4/1961 | Gibson | 446/458 X |
| 3,158,219 | 11/1964 | Edwards | 180/65.1 X |
| 3,205,962 | 9/1965 | Anderson | 180/20 |
| 3,241,019 | 3/1966 | Gross | 180/65.1 X |
| 3,514,681 | 5/1970 | Dorn et al. | 180/65.1 X |
| 3,667,156 | 6/1972 | Tomiyama et al. | 446/458 |
| 3,684,046 | 8/1972 | Begleiter | 180/65.6 |
| 3,820,617 | 6/1974 | Graff | 180/10 X |
| 3,938,608 | 2/1976 | Folco-Zambelli | 180/65.6 |
| 4,201,493 | 5/1980 | Braun | 180/20 X |
| 4,310,987 | 1/1982 | Chieffo | 446/458 |
| 4,408,502 | 10/1983 | Kraus | 74/798 X |
| 4,505,346 | 3/1985 | Mueller | 446/462 X |

FOREIGN PATENT DOCUMENTS

| | | | |
|---|---|---|---|
| 963295 | 2/1975 | Canada | 74/798 |
| 1442582 | 7/1976 | United Kingdom | 446/458 |

Primary Examiner—Richard A. Bertsch
Attorney, Agent, or Firm—Lloyd M. Forster

[57] ABSTRACT

A self-propelled roller drive unit with enclosed power source, motor(s) and transmission(s) coupled to external reaction load such as golf bag frame, wheelchair, industrial transport, personal transport or other drive unit.

11 Claims, 9 Drawing Sheets

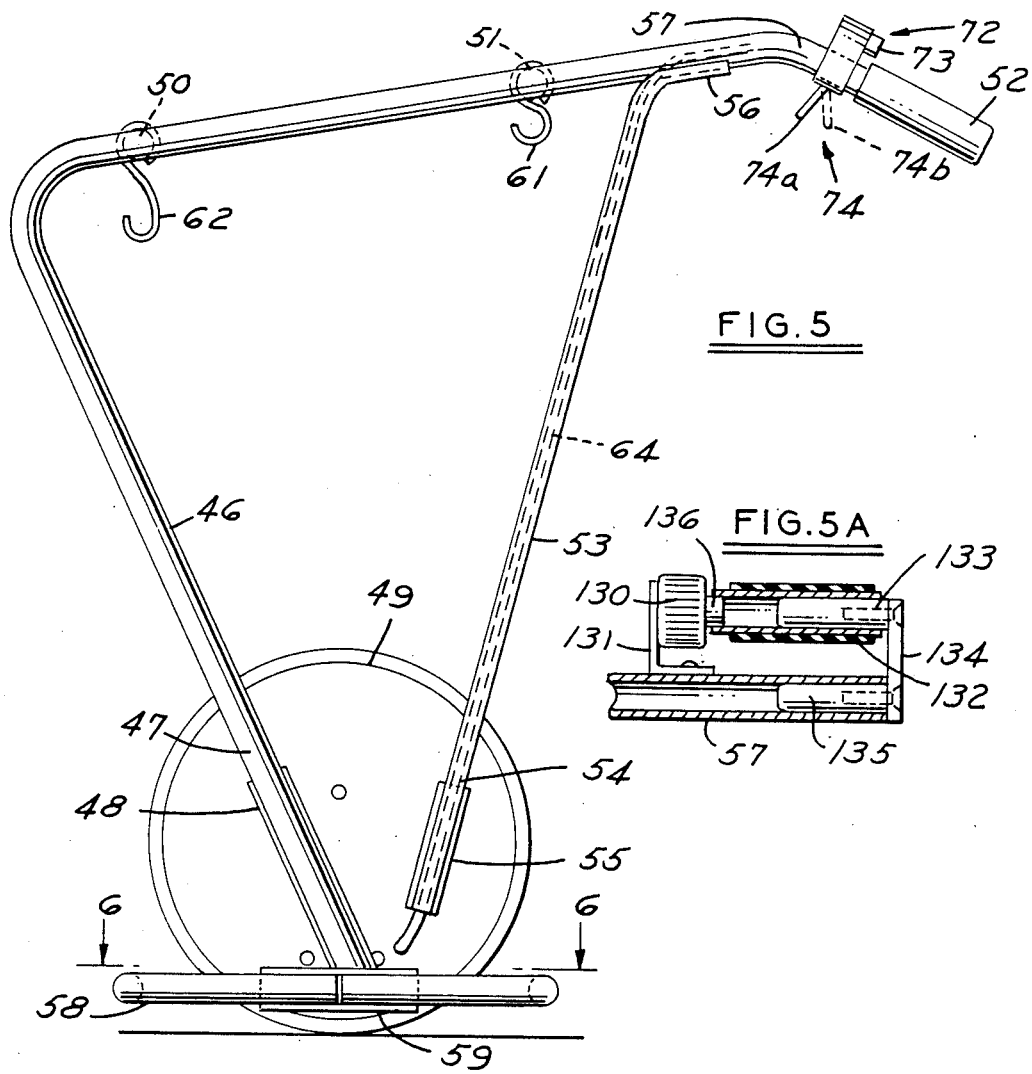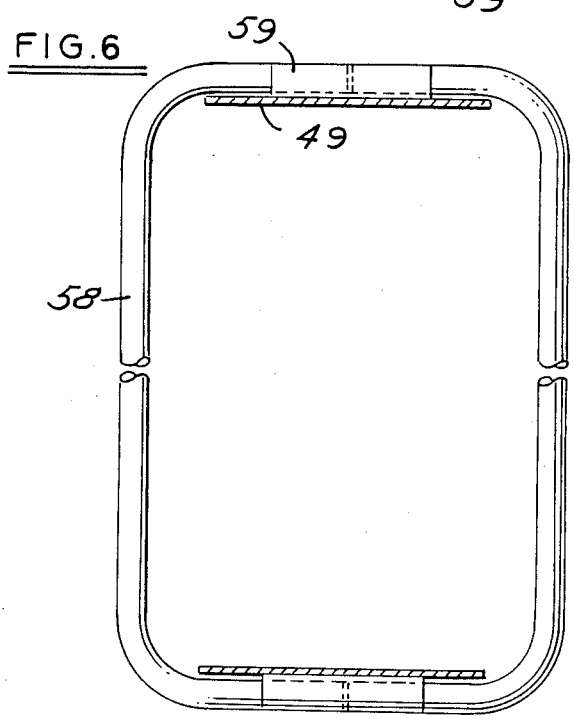

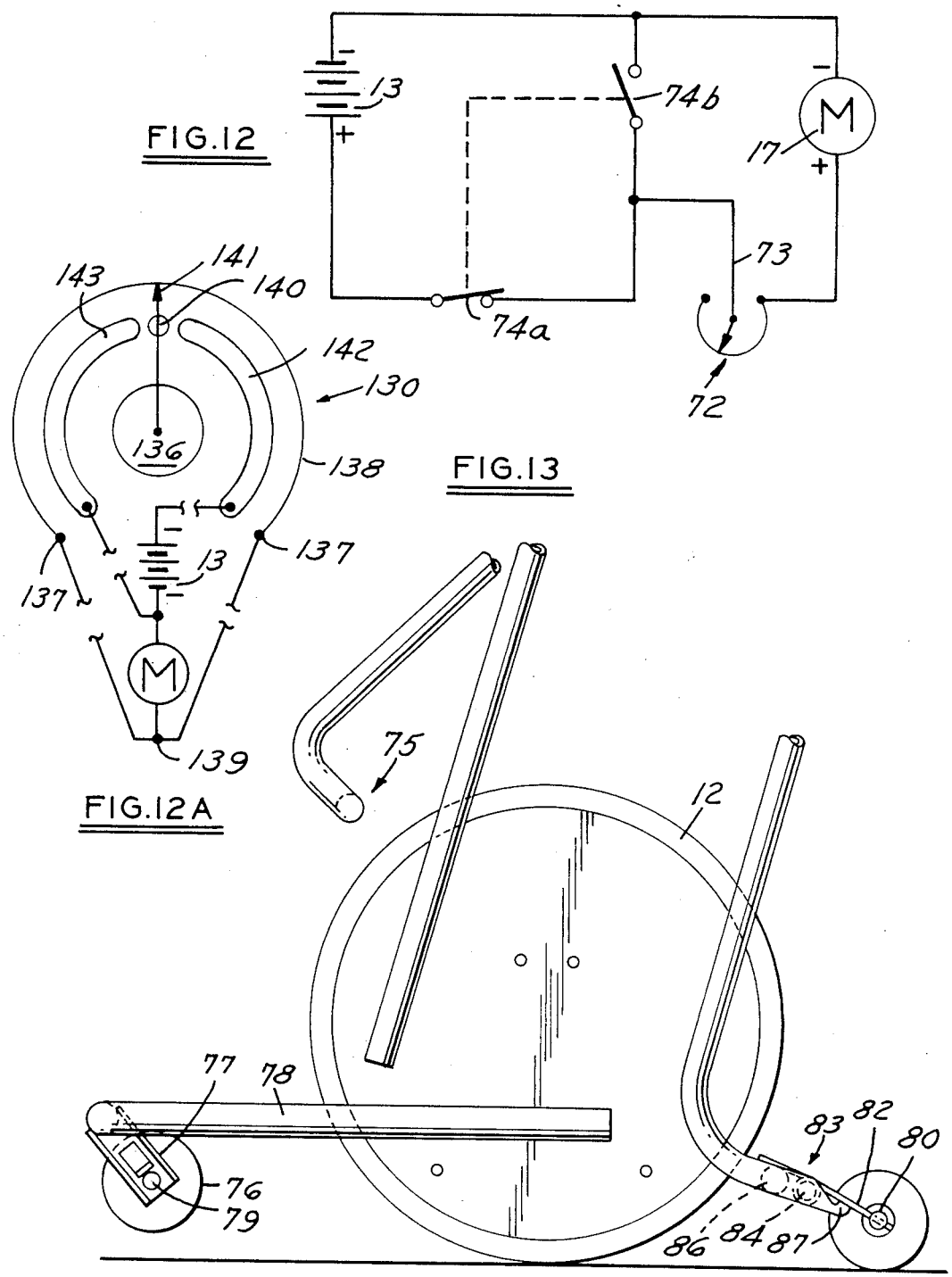

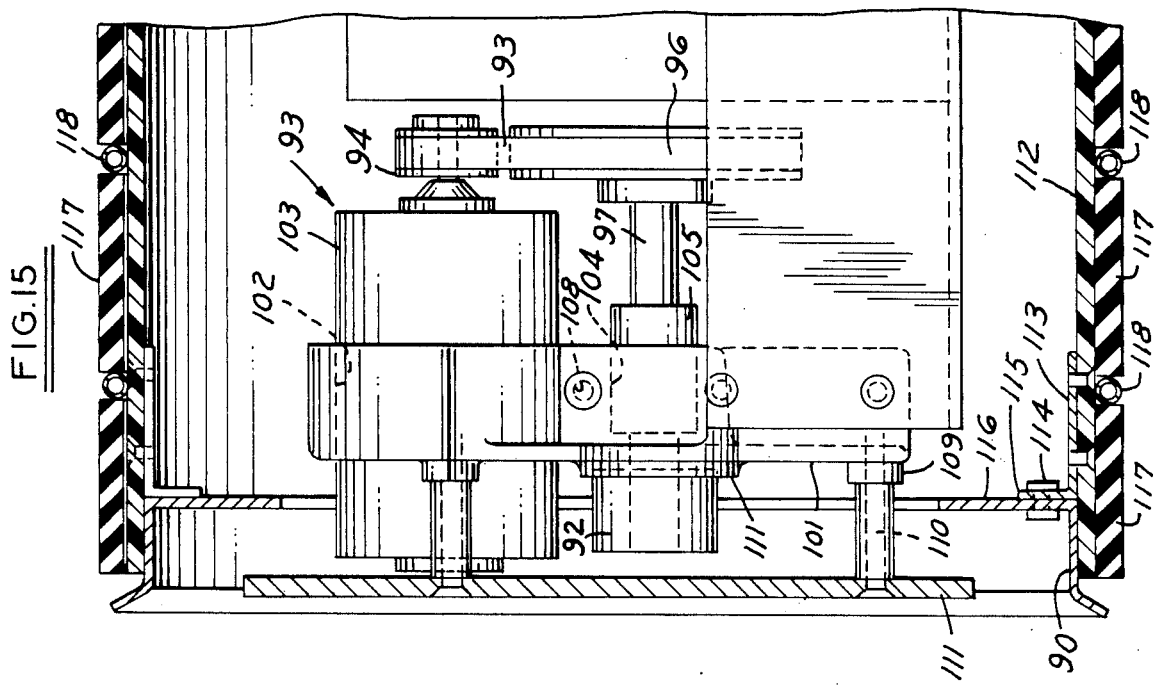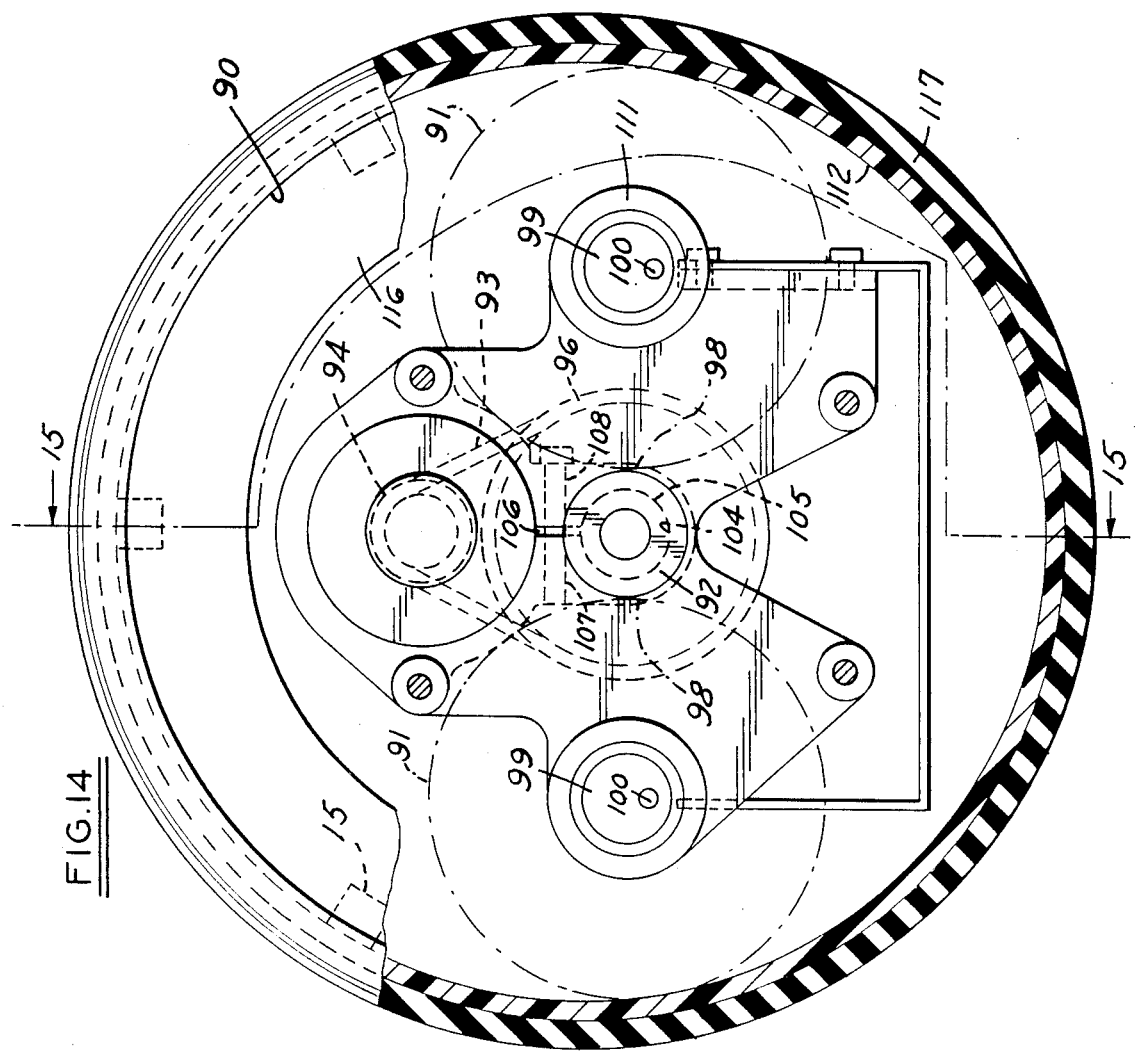

SELF-PROPELLED ROLLER DRIVE UNIT

BACKGROUND OF THE INVENTION

The closest known prior art U.S. Pat. No. 4,146,104 discloses a drive assembly comprising a power unit including a housing, wheel support means rotatably supported on the housing on bearing means encircling the housing, and geared transmission means directly coupling a power output shaft of the power unit to the wheel support means to cause it to rotate relative to the housing. The power unit is shown as an electric motor having an external power source with a statement in the specification that a fluid or internal combustion or other motor with an output shaft would be satisfactory as alternatives.

U.S. Pat. No. 3,897,843 discloses an electric motorized wheel wherein a pair of pneumatic tires are mounted on wheel hubs rigidly attached to a cylindrical motor frame having field coils mounted on the inner side with a motor rotor or armature rotatably supported within the motor frame. The rotor of the motor powered by an external power source drives an external planetary gear train having a reaction carrier mounted on an external base frame from which a single bearing for the complete assembly supports the entire wheel assembly.

U.S. Pat. No. 3,997,018 discloses a hydraulic wheel motor which drives a pneumatic rubber tire.

U.S. Pat. No. 3,631,659 discloses a lawnmower which is driven by a battery fed electric motor. A pair of side frames carry the cutters and roller adapted to roll over the lawn to be mowed. The batteries are accommodated in the roller which is in the form of a hollow cylinder.

U.S. Pat. Nos. 3,704,758, 3,820,617, 3,860,993, 3,893,532 and 3,948,332 show various forms of battery and electric motor powered golf bag carts all of which have the general configuration of a conventional pull cart having auxiliary fully exposed external battery motor and transmission components.

U.S. Pat. No. 672,713 discloses a horseless carriage employing a pair of drive wheels powered by electric motor and planetary gear trains which are mounted externally between the wheels.

SUMMARY OF THE PRESENT INVENTION

The self-propelled roller drive unit of the present invention encloses within a hollow cylinder, a complete self-energized power means—preferably a rechargeable electric battery power source, electric motor and transmission between the output shaft of the motor and the hollow roller. An external reaction load coupled to the enclosed power means adapts the drive unit to the form of a self-propelled golf bag cart, wheelchair, industrial transport, personal transport or other self-propelled drive unit.

The complete self-energized power means is nonrotatably supported as a sub-assembly within the cylinder which is closed at one end on a rigid frame mounting a battery, electric motor and planetary cransmission unit. The frame is supported at the closed end of the cylinder through a central bearing shaft and at the other end through a carrier with a pair of planets in traction driving contact with an annular internal ring secured at the open end of the cylinder as a part of the driven roller.

External frame connections to the respective ends of the carrier and bearing shaft and the load carried on such frame, as well as the weight of the internal power system, are distributed approximately equally between the central bearing at one end of the roller and traction planets at the other end.

The vertical loading on each traction planet is applied through a bearing having a projecting eccentric pin extending through two rigidly connected sides of a planet carrier. With the pin of each planet located below the planet bearing axis each planet is free to float horizontally to equalize contact pressure between a drive shaft, centered between the planets, and the internal roller drive ring.

The axes of the planets extend in a common horizontal plane located below the axis of the cylinder and form the base of an obtuse isosceles triangle relative thereto which provides a traction drive contact pressure at drive ring and drive shaft equal to the vertical load on each axle pin divided by the sine and tangent respectively of the base angle which is designed as a function of effective traction coefficients and minimum load/-torque ratios to prevent gross slippage in the traction drive under all operational driving conditions. Such transmission automatically increases traction drive contact pressure with additional load thereby providing an effective self-energizing feature to meet increased driving torque requirements incident to increased service loads on the roller drive unit.

It is possible to obtain an effective drive by using the output shaft of the electric motor directly as the drive shaft between the planets which may produce a single stage reduction suitable for the desired speed of the roller, e.g. in the order of 48:1 with a $\frac{1}{4}''$ motor shaft and 12" diameter drive ring. However, in a preferred embodiment, a two stage reduction is provided through a mounting of the motor above the substantially larger diameter drive shaft centered between the two planets, with a belt reduction drive between the motor output shaft and the planet drive shaft.

BRIEF DESCRIPTION OF THE DRAWINGS

FIG. 5 is an end elevation of the self-propelled roller adapted for use as a golf bag cart;

FIG. 5A is an enlarged fragmentary sectional view of an optional control handle;

FIG. 6 is a plan view taken along the line 6—6 of FIG. 5;

FIG. 12 is a schematic diagram of a typical electrical control for the self-propelled roller;

FIG. 12A is a schematic diagram of an alternative control;

FIG. 13 is an alternative preferred golf bag frame embodiment;

FIG. 14 is a schematic end view similar to FIG. 2 illustrating a preferred embodiment of the transmission arrangement;

FIG. 15 is a fragmentary sectional view taken along the line 15—15 of FIG. 14;

DETAILED DESCRIPTION OF THE DRAWINGS

Figure 1:
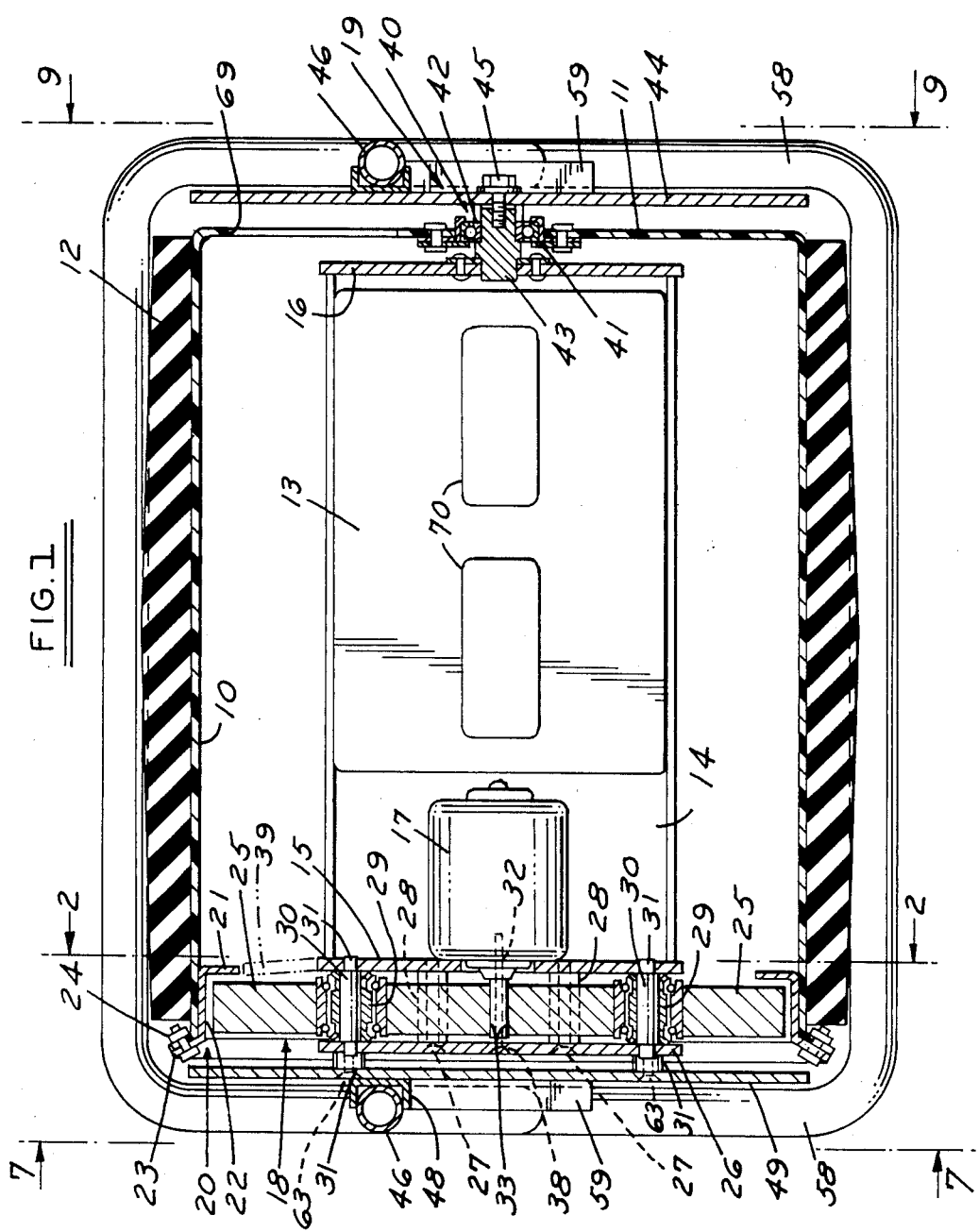
FIG. 1 is a sectional plan view through the center of a first embodiment of the self-propelled roller assembly of the present invention taken along the line 1—1 of FIG. 2.
Figure 2:
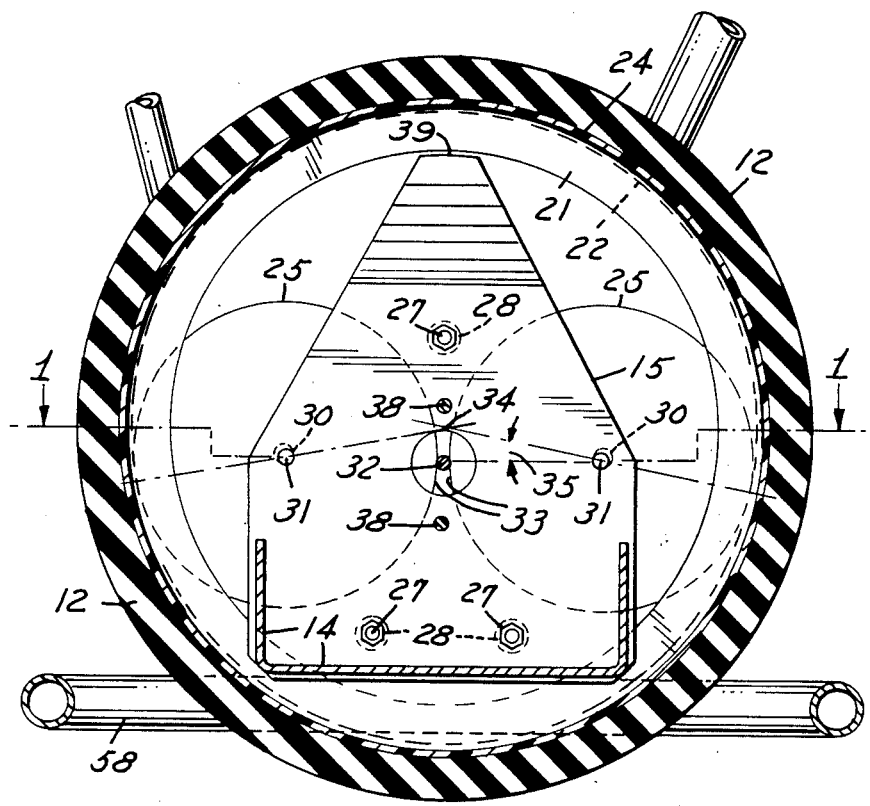
FIG. 2 is a sectional end elevation taken along the line 2—2 of FIG. 1.

Referring to the FIGS. 1 and 2 embodiment of the present invention self-propelled roller includes hollow cylinder 10, preferably constructed of molded plastic such as polyethylene having an integral end closure 11 and serving to mount a resilient tire such as foamed polyurethane, having a suitable tread with dense abrasion resistant skin, applied to the outer surface by molding or otherwise, and somewhat crowned in the center to facilitate steering while engaging ground surface over the entire width to provide lateral stability. Within hollow cylinder 10 battery 13 is supported on tray 14 secured to end plates 15 and 16 providing an internal mounting for electric motor 17, planetary traction transmission 18 and roller axle 19.

Metal ring 20 preferably formed as a cylindrical spinning or stamping having an internal flange 21, cylindrical traction drive surface 22 and external flange 23 is suitably secured within one end of the roller cylinder as by flange fasteners 24. A pair of traction planets 25 are mounted on a carrier formed by end plate 15 and external plate 26 secured rigidly together by three connecting bolts 27 having spacer sleeves 28. Anti-friction bearing hub 29 of each planet 25 is mounted on cylindrical pin 30 having reduced eccentric ends 31 pivotally engaging end plates 15 and 26. Cylindrical output drive shaft 32 of electric motor 17 has an axis located on a common center plane with the axes of planets 25 and has a traction driving contact with outer cylindrical surfaces 33 of respective planets 25. As best shown in FIG. 2, the plane of the planet axes is located below the central roller axis 34 in an obtuse isosceles triangular relationship with a small base angle 35, in the order of 10 to 15 degrees determined as hereafter described in detail, providing a toggle action to amplify the vertical gravity load of battery, motor, tray, end plates and external load applied through carrier plates 15 and 26 in order to assure adequate traction pressure to avoid gross slippage. Eccentric pins 30, 31 accommodate lateral float of planets 25 to equalize contact pressure between drive shaft 32, planet surfaces 33 and internal ring surface 22.

Referring to the geometry of the isosceles triangle having base angle 35, any vertical load applied by carrier 15, 26 at each eccentric pin 30, 31 must be supported by contact reaction pressure supplied by ring surface 22 along a radial line forming one side of angle 35 which contact pressure will equal the vertical gravity load divided by the sine of angle 35. The horizontal contact pressure on each side of motor drive shaft 32 will equal such vertical load divided by the tangent of angle 35. In order to prevent gross slippage between drive shaft 32 and planet surfaces 33, the minimum ratio of vertical load at each eccentric pin 30, 31 divided by tangential traction torque force at each drive shaft/planet surface contact 32, 33, must be equal to or greater than the ratio of the tangent of angle 35 divided by the effective coefficient of traction at drive contact 32, 33. Likewise, in order to avoid gross slippage at planet contact 33 with ring 22 such ratio must be equal to or greater than the sine of angle 35 divided by the effective coefficient of traction at the planet ring contact 33, 22. In determining an appropriate angle 35 for a given embodiment such as the illustrated golf bag car, the minimum vertical load on each planet 25 will be one-half of that fraction of the weight of the battery 13, motor 17 and rails 14 plus carrier plates 15 and 26 plus one-half of that fraction of the external frame which is attached to carrier plate 26, as later described, while the maximum traction force applied by motor shaft 32 will be determined by the stall torque of electric motor 17 with full battery voltage applied. The prevailing traction coefficient will depend on drive shaft, planet and ring materials and surface condition determined emperically under prevailing running conditions. Any live load in addition to empty load on planets 25 will result in additional traction drive contact pressure as a self-energizing safety factor against gross slippage. In a typical case of a golf bag cart application with ⅛ H.P. 3500 RPM motor, full size 12 Volt battery, 50:1 transmission ratio, smoothly ground steel motor shaft 32, phenolic planets 25 and aluminum ring surface 22, angle 35 in the range of 10 to 15 degrees has been found satisfactory.

Figure 3:
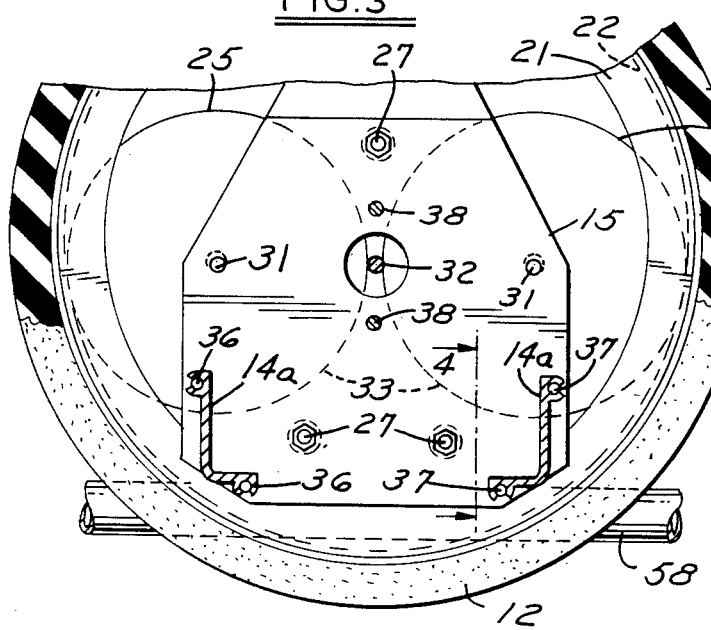
FIG. 3 is a fragmentary view similar to FIG. 2 illustrating alternative battery support rails.
Figure 4:
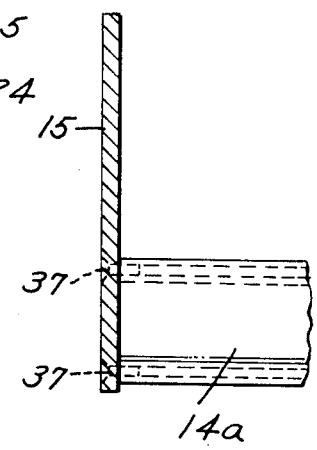
FIG. 4 is a side view of the alternative support for mounting battery, electric motor and transmission within the roller.

In the alternative construction of FIGS. 3 and 4, rails 14a are formed as aluminum angle extrusions cut to length with extruded apertures 36 which may be tapped for or self-tapped by flat headed screws 37 seated in counter sunk holes of end plates 15 and 16. As also shown in FIGS. 2 and 3 electric motor 17 is attached to end plate 15 by threaded studs, projecting from the motor housing through holes 38 in the end plate, to which nuts are applied.

As illustrated in FIGS. 1 and 2 upper end 39 of end plate 15 is bent slightly to oppose the inner surface of flange 21 as an upper limit stop against any substantial upward displacement of the planet carrier.

With reference to the other end of the roller illustrated in FIG. 1 the integral or otherwise attached end closure 11 is provided with anti-friction bearing 40 having outer race 41 suitably attached within a central opening and having inner race 42 mounted on fitting 43 secured to end plate and adapted to attach end plate 44 secured by bolt 45 to which an external frame may be secured as hereinafter described with reference to other figures.

FIGS. 1 and 5 illustrate a typical external frame adapted for golf bag suspension and manual guidance comprising, for attachment to either end of the roller, main side tubes 46 anchored each at its lower end 47 in channel 48 secured respectively to circular disc plates 49 and 44, providing support for lower cross tube 50 and upper cross tube 51, and terminating in a handle grip 52. Tubular braces 53 similarly attached at lower ends 54 through channels 55 to disc plates 49 and 44 support at 56 the upper handle ends 57 of the main side frame tubes. Tubes 58 secured by channels 59 to disc plates 49 and and 44 support the golf bag carrier against forward or rearward tipping beyond park position while providing running clearance for the running attitude.

In the modification shown in FIG. 13, stabilizing rollers 76 permit the golf bag carrier to run without manual balancing and the pivotal mounting 79 for one of the rollers with a preloaded spring retention against a positive stop, accommodates yielding when the main roller encounters a slight depression.

As shown in FIG. 5, upper hook 61 and lower hook 62 respectively attached to cross tubes 51 and 50 provide suspension respectively for the upper and lower shoulder strap rings of a golf bag centered over the roller with the club heads extending between handles 52. Pairs of laterally spaced hooks 61 and 62 may be used for double bag carriage if and when required.

Figure 7:
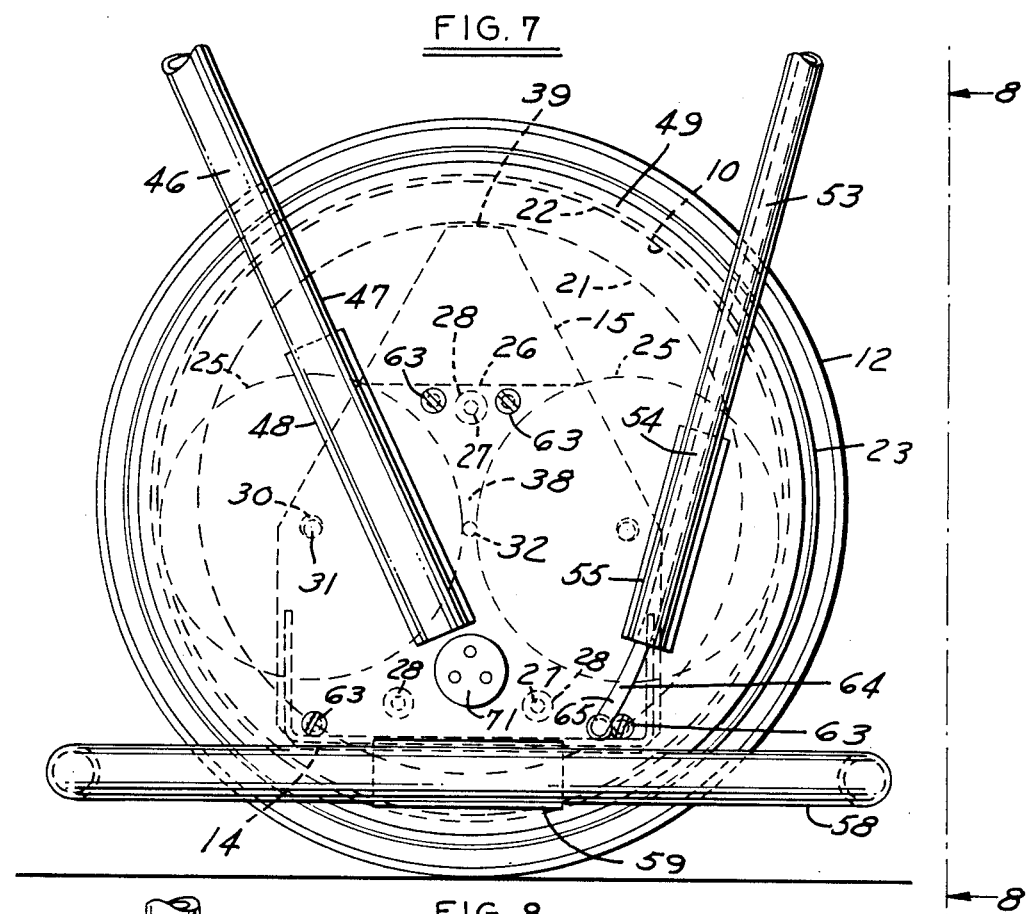
FIG. 7 is an end elevation taken along the line 7—7 of FIG. 1.
Figure 8:
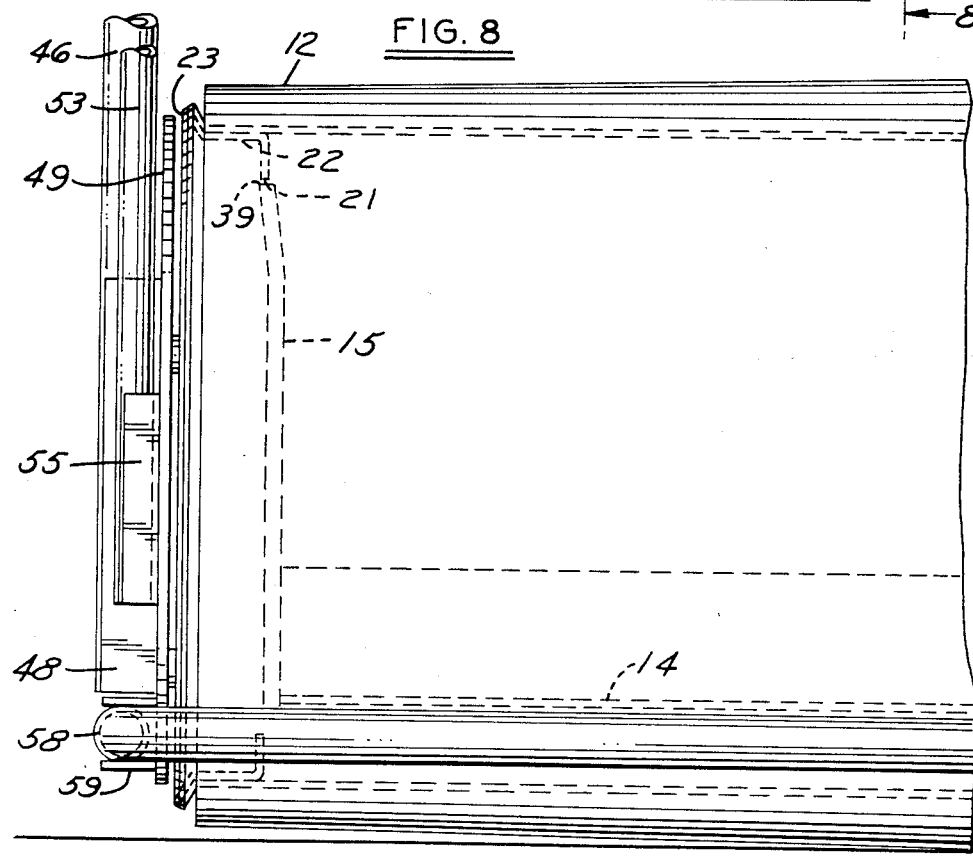
FIG. 8 is a fragmentary view taken along the line 8—8 of FIG. 7.

The mounting relationship of frame tubes 46 and 53 to disc plate 49 and to carrier plate 26 is illustrated in FIG. 7 including tapped holes 63 in plate 26 for attachment of disc plate 49. Electric wiring 64 from a hand grip tube 52 extends through tubing 55 at the lower end of which it enters into holes 65 extending through carrier plates 26 and 15.

Figure 9:
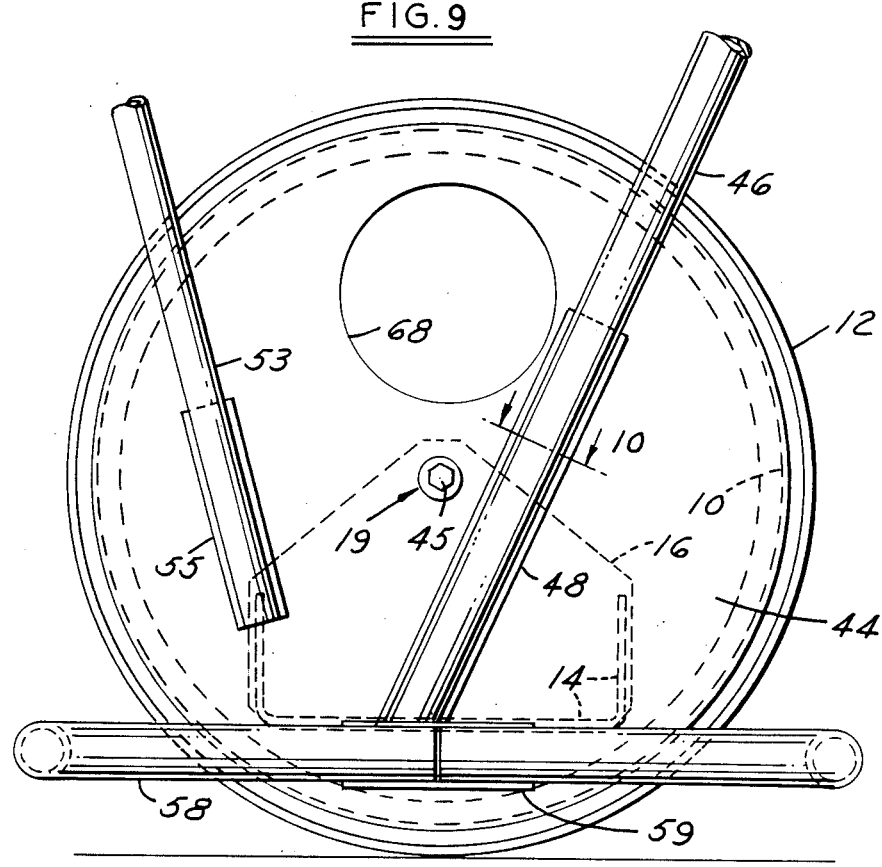
FIG. 9 is an end elevation taken along the line 9—9 of FIG. 1.
Figure 11:
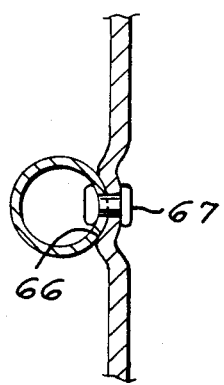
FIG. 11 is a fragmentary sectional view similar to FIG. 10 showing an alternative construction.
Figure 10:
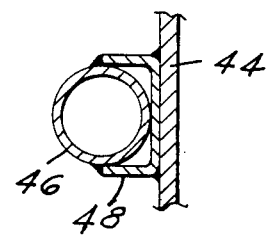
FIG. 10 is a fragmentary sectional view taken along the line 10—10 of FIG. 9.

With reference to FIGS. 9 and 10 attachment to end plate 44 is illustrated for main frame tube 46, brace tube 53 and cross tube 58 attached by similar channels 48, 55 and 59. As shown in FIG. 11, a preferred method of tube attachment to end plates 44 and 49, formed as die castings with arcuate recesses 66, is through blind rivets 67 eliminating the need for separate channel brackets.

For occasional servicing of the battery with addition of water an access hole 68 is provided at the top of end plate 44 which may be aligned with any of three similar holes 69 equally spaced in end 11 of the roller permitting battery caps 70 to be removed and a filler appliance inserted without undue inconvenience. With reference to FIG. 7 a suitable recharge plug 71 for the battery is provided for which clearance holes are likewise provided in the planet carrier plates.

With reference to FIGS. 5 and 12, rheostat 72 manually controlled by knob 73 in series with motor 17 controls driving speed when toggle switch 74 is in the "run" position 74a and motor braking when in the "brake" position 74b. Maximum braking as well as maximum speed is obtained with minimum resistance setting of the rheostat with progressively reduced speed or braking with progressively increased resistance. Such dynamic motor braking has been found to provide adequate braking for the steepest downwardly inclined cart paths encountered in a normal golf course.

With reference to FIGS. 5A and 12A a preferred control is illustrated wherein rheostat 130 is mounted through bracket 131 on tube 57, hand grip 132 for actuating the rheostat is mounted on bearing 133 bolted to connector 134 extending from plug 135 press fit in tube 157. Hand grip 132 may thus be employed for steering as well as speed control with a continuous range in rotating rheostat knob 136 from maximum power at maximum clockwise position to a neutral power off at mid position as shown in FIG. 12A to a maximum motor braking at maximum counterclockwise position.

Such continuous range of control from maximum power through zero to maximum braking is achieved by the wiring illustrated in FIG. 12A wherein both ends 137 of rheostat resistor 138 are wired to a common terminal 139 of the motor while a wiper circuit through contact 140 and resistance wiper 141 from contact strip 142 for battery power speed control and isolated contact strip 143 for the motor braking circuit bypassing the battery. In either power or braking mode a pair of circuits through the entire rheostat resistance will be established with the resultant resistance being maximum at the center position illustrated and continuously reduced to minimum through either clockwise or counterclockwise rotation. Since maximum braking as well as maximum power are reached at the respective minimum resistance position the total effect of this control is one of clockwise rotation of hand grip 132 to go faster and counterclockwise rotation to go slower without any need to switch from power on to braking mode other than through the natural rotation of hand grip 132 to meet requirements; since steering as well as speed control may be effected through hand grip 132 maximum convenience of operation is assured.

With reference to FIG. 13 an alternative and preferred embodiment for golf bag fram is illustrated wherein a single hook is provided for the top shoulder strap ring and a V-shaped support 75 is provided above the roller to engage and center the lower end of the bag. A forward stabilizing roller 76 is mounted on a pair of fixed brackets 77 welded to the center of tube 78 with a roller axle 79 extending between the brackets. At the rear of the main roller a resiliently mounted stabilizing roller 80 having an axle 81 is mounted on the ends 82 of a pair of torsion springs 83 coiled on shaft 84 extending between a pair of brackets 85 welded to the center of tube 86, preferably with bracket extensions 87 formed to provide stops for preloading torsion springs 83 whereby in traveling with the load of battery, motor, frame and golf clubs substantially centered over the main roller, only slight pressure will be applied on the forward and rear stabilizing rollers 76 and 80 over normal terrain, including slight undulations in the turf, as well as in ascending and descending golf course hills, without deflecting the torsion springs 83. However, where local depressions are encountered between stabilizing rollers 76 and 80 under the main roller which would otherwise cause a loss of traction, torsion springs 83 will yield under the unsupported weight of the main roller to avoid loss of traction.

With reference to FIGS. 14 and 15 an alternative transmission and motor mounting of a preferred embodiment is disclosed providing a two-stage reduction in the drive of ring 90 through planets 91 and central power output traction sun 92 with use of an intermediate timing belt 93 between pulley 94 driven by motor 95 and pulley 96 connected to drive shaft 97 for sun 92. Such arrangement permits substantially lower unit pressure at the central traction driving contact lines 98 permitting the use of a steel sun 92, plastic planets 91 and steel ring 90 providing substantially quieter operation than is possible with metal planets appropriate for the high unit pressures of a small diameter direct drive from the motor output shaft.

Planet bearings 99 are provided with substantially offset eccentric pins 100 for supporting the load imposed by the planet carrier. The inner side 101 of the carrier formed as a casting with cylindrical opening 102 for motor housing 103 and cylindrical bore 104 for bearing 105 rotatably supporting drive shaft 97. Through slot 106 with tapped hole 107 and clearance hole 108 accommodate assembly and clamping of both motor and shaft bearing with a single bolt. Four pads 109 with tapped holes 110 serve to secure outer carrier plate 111 with bolts in a manner similar to the FIG. 1 embodiment. Needle bearing centers 99 having end surfaces equal to the width of drive planets 91 are retained by machined bosses 111 for a running fit and free eccentric pin articulation by spacers for the four connecting bolts engaging tapped holes 110.

Drive ring 90 is preferably attached to cylinder 112 by a plurality of clips 113 riveted on the inner surface of cylinder 112 with suitable fasteners 114 connecting the respective flanges 115 and 116. Preferred rubber tread means for cylinder 112 is provided by a plurality of independent rubber rings 117 fitting loosely on cylinder 112 in both circumferential and axial directions with low friction spacer tubes 118 provided therebetween in order to accommodate differential slipping on the plastic cylinder 112 to facilitate turning the roller with ground engagement of the rubber rings 117.

Figure 16:
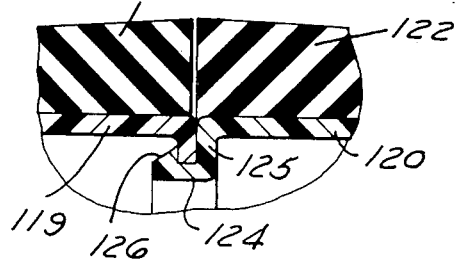
FIG. 16 is a fragmentary sectional view illustrating the center joint of a modified dual self-propelled roller construction.
Figure 17:
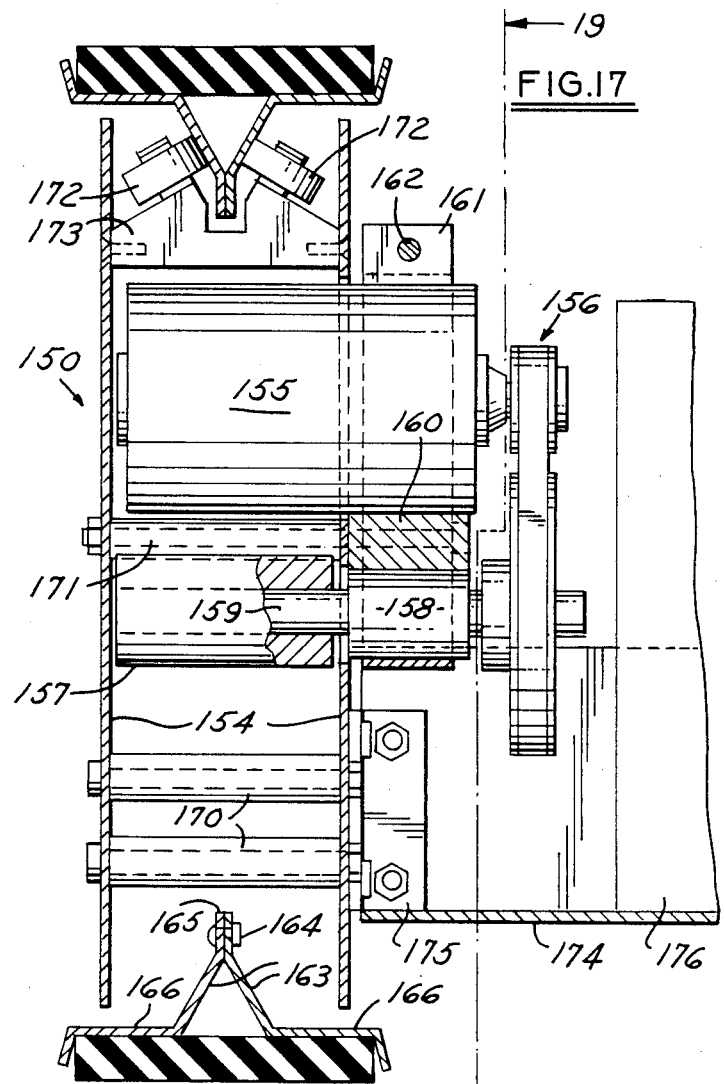
FIG. 17 is a sectional view through one of a pair of roller wheels which may be employed in an optional form of separate differential drive applications.
Figure 18:
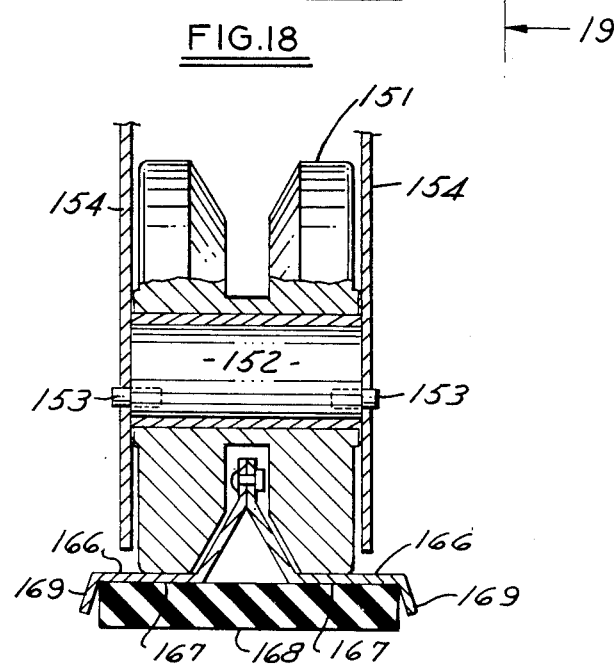
FIG. 18 is a partially sectioned view of one of the two planetary elements employed in each wheel.
Figure 19:
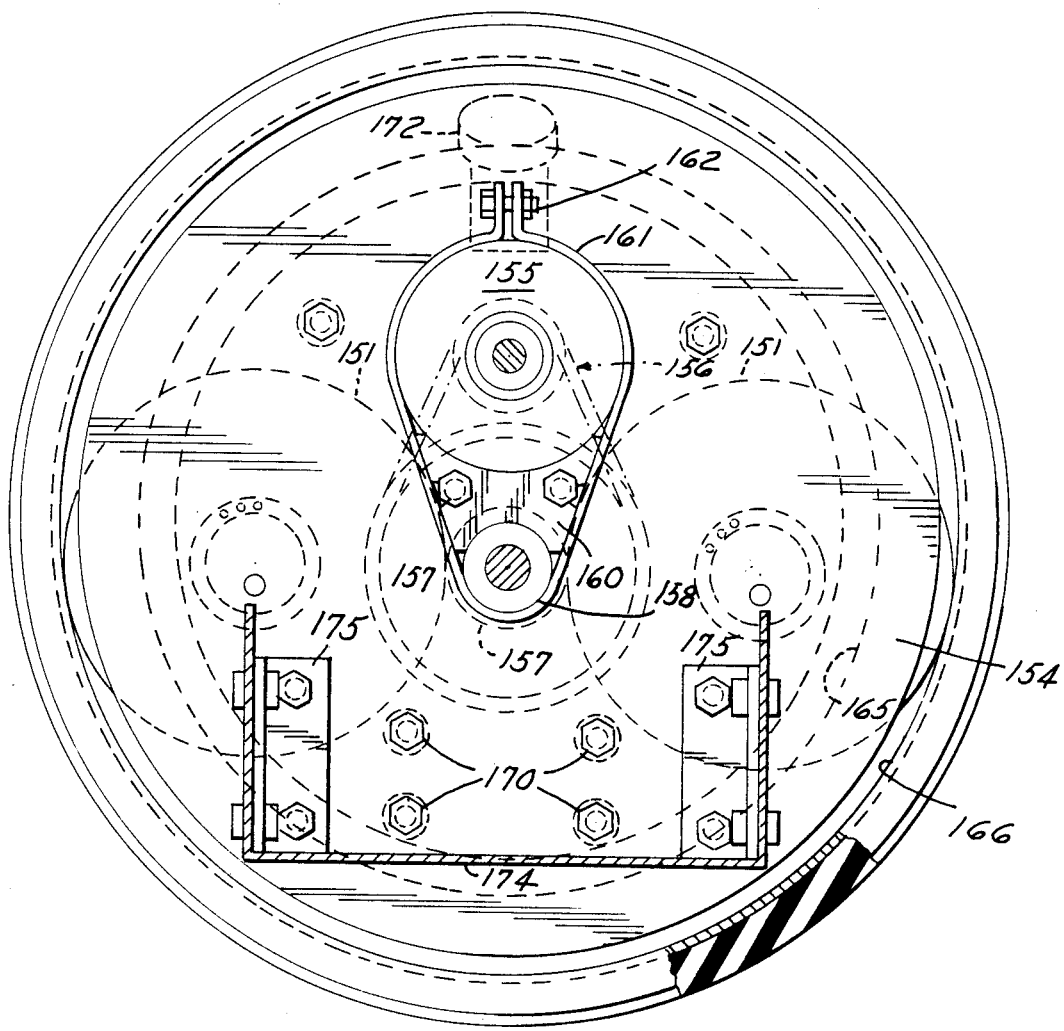
FIG. 19 is a sectional view taken along the line 19—19 of FIG. 17.

With reference to FIG. 16 illustrating the center connection for a dual roller having coaxial roller halves 119 and 120 with respective separate tire treads 121 and 122, internal annular end flange 123 of roller half 119 is engaged by recessed annular extension 124 of internal annular end flange 125 of roller half 120 with a free sliding fit to accommodate differential rotation of the respective roller halves. Tapered end 126 of extrusion 124, together with a plurality of axial slits (not shown) in extension 124 if necessary to provide added flexibility permit the roller halves to be snapped together in assembly.

Optionally, two roller halves may be employed having separated facing end closures with bearings similar to those shown at 11 and 40 of FIG. 1 and with a common battery interposed therebetween under the wheel chair seat.

Figure 20:
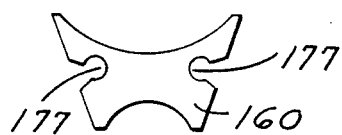
FIG. 20 is an end view of an optional motor and transmission mount per se as shown installed in FIGS. 17 and 19.

With reference to FIGS. 17-20 a further alternative form of two roller halves each constructed as a wide wheel 150 housing a pair of wide V-recessed planetary traction rolls 151 mounted on bearings 152 loaded by eccentric pins 153 engaged by pair of carrier plates 154 through one of which motor 155 projects to a transmission timing belt reduction drive 156 for driving central traction sun 157 engaging both sides of each traction roll 151. Bearing 158 for drive shaft 159 is clamped to motor mount 160 by clamp ring 161 bolted at 162. A pair of drive rings 163 bolted together at 164 through inwardly projecting flanges 165 have inner drive surfaces 166 engaged respectively by spaced tabs of traction rolls 151. Outer perimeters 167 of drive rings 163 mount wide rubber rings 168 retained by flanges 169. Spacers 170 bolted between carrier plates 154 together with spacers 171 bolted through mounting bracket 160 serve to provide a rigid structure for the complete wheel assembly with integral motor and transmission. A pair of guide rolls 172 mounted on bracket 173 at the top of the wheel serve together with traction rolls 151 to stabilize the position of drive rings 163 relative to the support structure provided by carrier plates 154. Transverse tray 174 bolted through angle brackets 175 to inner carrier plates 154 serve to mount intermediate battery 176 as well as a wheel chair seat and stabilizing rolls (not shown) serving a purpose similar to those illustrated in FIG. 13. With reference to FIG. 20 mounting bracket 160 may be formed as an extrusion including integral bolt slots 177 providing a lighter and simpler alternative to the casting mounting of FIGS. 14 and 15.

It will be understood that such dual rollers or wheels, powered by the single central battery, through the use of a separate reversing switch for each motor and individual motor speed control actuated through a common manual control system accommodates steering for an application such as wheel chairs by differential speed of the respective roller halves and, upon single switch reversal, direct turning on the vertical centerline of the chair may be accomplished.

In any such wheel chair application, direct substantially balanced seating over the roller may be readily provided with suitable light duty stabilizing rollers, such as shown in FIG. 13, so that outdoor use on lawns or otherwise may take advantage of the broad "footprint" of the roller halves effectively distributing low unit pressure weight over any riding surface.

In other applications for industrial, hospital, airport, recreational or general transport a wide variety of suitable frames may be adapted for coupling to the internal self-contained power system of the roller. While rechargeable battery power source is preferred for most applications, an internal combustion engine of appropriate size may be installed with an output shaft driven by centrifugal clutch or other releasable coupling adapted to drive the transmission planets.

I claim:

1. Self-propelled roller drive unit characterized by hollow cylindrical roller internally mounted self-energized power means including rotary power output means, and planetary traction speed reduction transmission means having planet carrier means for coupling to external reaction load and planet means for transmitting traction drive between said output means and said roller, and further characterized by said planet means comprising dual traction planet mounted on said planet carrier means with spaced parallel rotational axes, said power means having a rotational axis parallel and substantially coplanar with said spaced rotational planet axes, and a rotational roller axis extending parallel to said spaced planet axes offset from their common plane so that lines joining the three axes in a plane normal thereto form an obtuse isosceles triangle.

2. Self-propelled roller drive unit as set forth in claim 1 further characterized by said means for transmitting traction drive including an annular internal roller ring traction drive surface providing reaction pressurized dual planet drive contacts below the horizontal diameter of said roller ring supporting dual planet radial loads imposed by said carrier means, and means for applying a load on said carrier sufficient to prevent gross slippage in said traction drive between said output means and said roller under prevailing traction coefficients and maximum output torque operating conditions.

3. Self-propelled roller drive unit as set forth in claim 2 further characterized by the carrier mounting of said dual planets including means accommodating lateral self-adjustment to the planet axes in their transverse plane to provide balanced contact pressure with said power output means and internal roller ring.

4. Self-propelled roller drive unit as set forth in claim 3 wherein said means accommodating self-adjustment of the planet axes comprises an eccentric pin carrier mounting for each planet.

5. Self-propelled roller drive unit as set forth in claim 2 further characterized by said annular internal ring being provided at one end of said roller, central bearing means being provided at the other end of said roller, and mounting means for said self-energized power means supported at its respective ends by said bearing means and said internal ring.

6. Self-propelled roller drive unit as set forth in claim 2 including plastic roller housing means having an integral end provided with a central axial bearing, and the other end being provided with said annular internal roller ring.

7. Self-propelled roller drive unit as set forth in claim 2 further characterized by a roller housing having an outer resilient roller tread.

8. Self-propelled roller drive unit as set forth in claim 7 wherein said resilient roller tread comprises a plurality of independent rings loosely mounted on the outer surface of said roller housing capable of ground engagement with differential ring slippage on said housing to facilitate turning.

9. Self-propelled roller drive unit characterized by hollow cylindrical roller internally mounted self-energized power means including rotary power output means, and planetary traction speed reduction transmission means having planet carrier means for coupling to external reaction load and planet means for transmitting traction drive between said output means and said roller, further characterized by axially aligned differentially rotatable roller drive unit halves each provided with said rotary power output means and planetary traction speed reduction transmission means.

10. Self-propelled roller drive unit as set forth in claim 9 wherein said self-energized power means includes a rechargeable electric storage battery interposed between a pair of electric motors providing the rotary power output means.

11. Self-propelled roller drive unit as set forth in claim 9 wherein said roller halves are joined at their adjacent ends by connecting means accommodating relative differential rotation.

* * * * *